(12) United States Patent
Wei et al.

(10) Patent No.: US 10,877,478 B2
(45) Date of Patent: Dec. 29, 2020

(54) MOTION-CHARACTERISTIC BASED OBJECT CLASSIFICATION FOR AUTOMATED VEHICLE

(71) Applicant: Motional AD LLC, Boston, MA (US)

(72) Inventors: Junqing Wei, Bridgeville, PA (US); Wenda Xu, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/174,241

(22) Filed: Oct. 29, 2018

(65) Prior Publication Data

US 2019/0204833 A1    Jul. 4, 2019

Related U.S. Application Data

(63) Continuation of application No. 15/480,520, filed on Apr. 6, 2017, now Pat. No. 10,114,375.

(51) Int. Cl.
| | |
|---|---|
| *G05D 1/00* | (2006.01) |
| *G01S 17/86* | (2020.01) |
| *G06K 9/00* | (2006.01) |
| *B62D 15/02* | (2006.01) |
| *G05D 1/02* | (2020.01) |
| *G01S 17/50* | (2006.01) |

(Continued)

(52) U.S. Cl.
CPC ......... *G05D 1/0088* (2013.01); *B62D 15/025* (2013.01); *B62D 15/0265* (2013.01); *G01S 7/415* (2013.01); *G01S 7/4802* (2013.01); *G01S 13/931* (2013.01); *G01S 17/50* (2013.01); *G01S 17/86* (2020.01); *G01S 17/931* (2020.01); *G05D 1/0246* (2013.01); *G05D 1/0257* (2013.01); *G06K 9/00335* (2013.01); *G06K 9/00805* (2013.01); *G08G 1/165* (2013.01); *G08G 1/166* (2013.01)

(58) Field of Classification Search
USPC ......................................................... 701/27
See application file for complete search history.

(56) References Cited

U.S. PATENT DOCUMENTS

| 6,025,796 A | * | 2/2000 | Crosby, II | ............. | B60R 21/013 |
| | | | | | 342/70 |
| 6,097,332 A | * | 8/2000 | Crosby, II | ............. | B60R 21/013 |
| | | | | | 180/271 |

(Continued)

FOREIGN PATENT DOCUMENTS

JP    2016-162424    9/2016

OTHER PUBLICATIONS

European Extended Search Report in European Application No. 1816566.1 dated Oct. 18, 2018, 7 pages.

*Primary Examiner* — Tyler D Paige
(74) *Attorney, Agent, or Firm* — Fish & Richardson P.C.

(57) ABSTRACT

An object-classification system for an automated vehicle includes an object-detector and a controller. The object-detector may be a camera, radar, lidar or any combination thereof. The object-detector detects an object proximate to a host-vehicle. The controller is in communication with the object-detector. The controller is configured to determine a density of the object based on a motion-characteristic of the object caused by air-movement proximate to the object, and operate the host-vehicle to avoid striking the object with the host-vehicle when the density of the object is classified as dense.

18 Claims, 2 Drawing Sheets

(51) Int. Cl.
*G01S 7/41* (2006.01)
*G01S 7/48* (2006.01)
*G01S 13/931* (2020.01)
*G08G 1/16* (2006.01)
*G01S 17/931* (2020.01)

(56) References Cited

U.S. PATENT DOCUMENTS

| | | |
|---|---|---|
| 7,660,436 B2 | 2/2010 | Chang et al. |
| 8,108,147 B1 * | 1/2012 | Blackburn ............. G08G 1/166 |
| | | 235/454 |
| 9,633,560 B1 | 4/2017 | Gao et al. |
| 10,114,375 B1 * | 10/2018 | Wei .................... G06K 9/00335 |
| 2005/0196020 A1 | 9/2005 | Cornmaniciu et al. |
| 2008/0262669 A1 * | 10/2008 | Smid ................... G05D 1/0278 |
| | | 701/23 |
| 2009/0024278 A1 * | 1/2009 | Kondo .................... B62D 1/28 |
| | | 701/41 |
| 2012/0116632 A1 * | 5/2012 | Bechtel ................ B60Q 1/1423 |
| | | 701/36 |
| 2013/0051624 A1 * | 2/2013 | Iwasaki ............. G06K 9/00791 |
| | | 382/103 |
| 2013/0222127 A1 | 8/2013 | Avalani |
| 2017/0158175 A1 * | 6/2017 | Fairfield .................. B60T 7/12 |
| 2018/0072298 A1 * | 3/2018 | Ito ....................... B60W 10/184 |
| 2018/0292823 A1 * | 10/2018 | Wei .................... G06K 9/00335 |

\* cited by examiner

MOTION-CHARACTERISTIC BASED OBJECT CLASSIFICATION FOR AUTOMATED VEHICLE

CROSS-REFERENCE TO RELATED APPLICATION

This application is a continuation of and claims priority to U.S. patent application Ser. No. 15/480,520, filed Apr. 6, 2017, the entire contents of which are incorporated herein by reference.

TECHNICAL FIELD OF INVENTION

This disclosure generally relates to an object-classification system for an automated vehicle, and more particularly relates to system that operates a host-vehicle to avoid striking an object with the host-vehicle when a density of the object is classified as dense.

BACKGROUND OF INVENTION

Automated vehicles are generally programmed to avoid running-over or striking any detected object. However, sudden evasive maneuvers are not necessary when the detected objected is an empty paper bag or small tumble-weed.

SUMMARY OF THE INVENTION

In accordance with one embodiment, an object-classification system for an automated vehicle is provided. The system includes an object-detector and a controller. The object-detector detects an object proximate to a host-vehicle. The controller is in communication with the object-detector. The controller is configured to determine a density of the object based on a motion-characteristic of the object caused by air-movement proximate to the object, and operate the host-vehicle to avoid striking the object with the host-vehicle when the density of the object is classified as dense.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
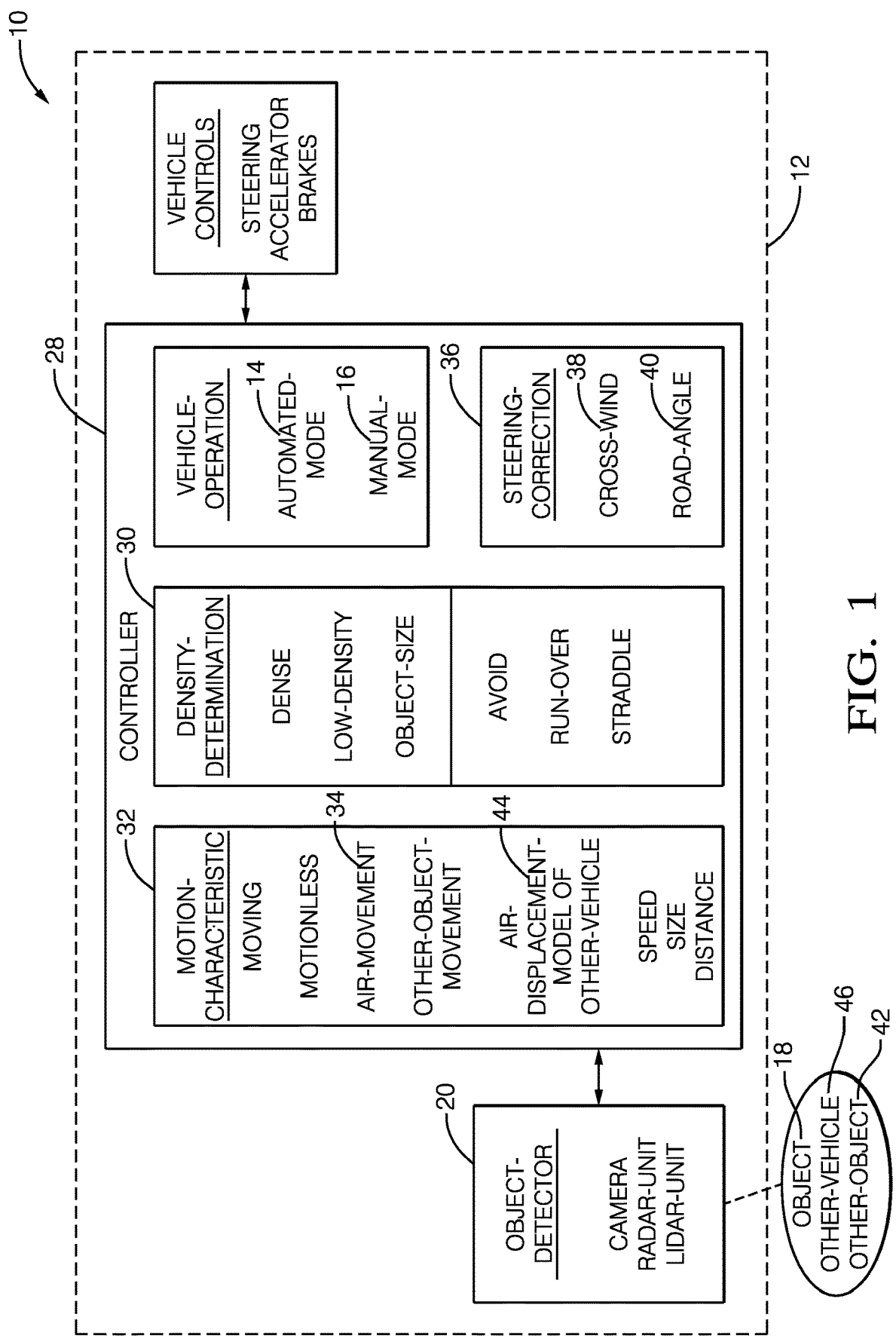
FIG. 1 is a diagram of an object-classification system in accordance with one embodiment.

FIG. 1 illustrates a non-limiting example of an object-classification system 10, hereafter referred to as the system 10. In general, the system 10 is suitable for use by an automated vehicle, a host-vehicle 12 for example. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination in order to operate the host-vehicle 12. However, full automation is not a requirement. It is contemplated that the teachings presented herein are useful when the host-vehicle 12 is operated in a manual-mode 16 where the degree or level of automation may be limited to momentarily taking control of the steering of the host-vehicle 12 to avoid a collision with, for example, an object 18.

The system 10 includes an object-detector 20 that detects objects proximate to, e.g. within two-hundred-meters (200 m) of, the host-vehicle 12. The object-detector 20 may include or consist of devices such as a camera, radar, lidar, or any combination thereof. The one or multiple devices that form the object-detector 20 are preferably, but not necessarily, mounted on the host-vehicle 12. If multiple devices are used, they may be co-located as suggested by FIG. 1, but this is not a requirement. The multiple devices may be distributed at different locations on the host-vehicle 12. It is also contemplated that some or all of the devices could be located remote from the host-vehicle 12 as part of traffic-monitoring-infrastructure.

Figure 2:
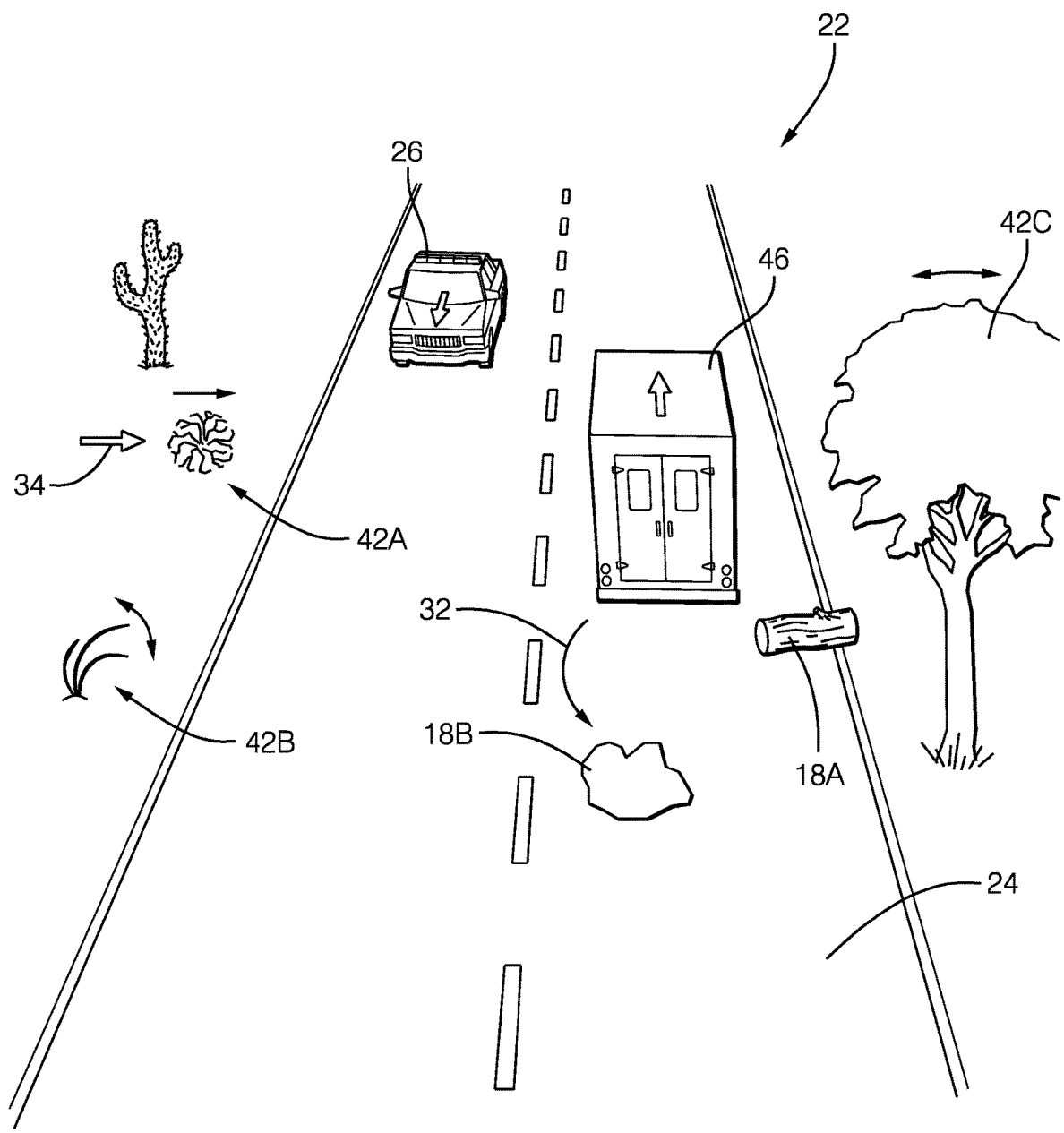
FIG. 2 is a scenario encountered by the system of FIG. 1 in accordance with one embodiment.

FIG. 2 illustrates a non-limiting example of a scenario 22 that could be encountered by the host-vehicle 12. The illustration shows an example field-of-view of the object-detector 20 (not shown in FIG. 2) that includes a roadway 24 forward of a host-vehicle 12 (not shown in FIG. 2). Various non-limiting examples of the object 18 are illustrated that include a log 18A that may have fallen from a logging-truck (not shown), and an empty plastic-bag 18B. As will be explained in more detail below, the system 10 described herein is advantageous over prior systems for automated vehicles because the system 10 is able distinguish the log 18A from the empty plastic-bag 18B. The system 10 classifies the log 18A as being something that the host-vehicle 12 should not run-over, i.e. the host-vehicle 12 should avoid. In contrast, the empty plastic-bag 18B (e.g. the type of plastic bag commonly used by grocery stores) is something the host-vehicle 12 could run-over if avoiding the empty plastic-bag 18B could cause the host-vehicle 12 to do something undesirable, e.g. swerve into the travel-path of an oncoming-vehicle 26.

Referring back to FIG. 1, the system 10 includes a controller 28 in communication with the object-detector 20. The controller 28 may include a processor (not specifically shown) such as a microprocessor or other control circuitry such as analog and/or digital control circuitry including an application specific integrated circuit (ASIC) for processing data as should be evident to those in the art. The controller 28 may include memory (not specifically shown), including non-volatile memory, such as electrically erasable programmable read-only memory (EEPROM) for storing one or more routines, thresholds, and captured data. The one or more routines may be executed by the processor to perform steps for controlling the host-vehicle 12 based on signals received by the controller 28 from the object-detector 20 as described herein.

The controller 28 is configured to or programmed to determine a density 30 of the object 18 (e.g. log 18A, empty plastic-bag 18B) based on a motion-characteristic 32 of the object 18 that is caused by an air-movement 34 proximate to (i.e. close enough to influence movement of) the object 18. A variety of techniques used to determine the presence of, or detect, the air-movement 34 are described below. The amount or degree to which a particular instance of the object 18 moves in response to the air-movement 34 indicates the motion-characteristic and is used to determine the density 30 of the object 18. By way of example, almost any instance of the air-movement 34 would cause the empty plastic-bag 18B to move on or across the roadway 24. However, it would take a very strong instance of the air-movement 34 to move the log 18A. That is, the density 30 is determined based on the motion-characteristic 32, i.e. how much the object 18 moves for a given instance of the air-movement 34.

It follows that the empty plastic-bag 18B would be characterized as having a low-density, so the system 10 or more specifically the controller 28 may not make any effort to avoid running-over the empty plastic-bag 18B. However, the log 18A would be characterized or classified as dense, so the controller 28 may operate the host-vehicle 12 to avoid striking the object 18 with the host-vehicle 12 when the density 30 of the object is classified as dense. For a given instance or amount or quantity or value or magnitude/direction of the air-movement 34, the object 18 may be characterized as moving or motionless. If the object 18 is characterized as moving, then the amount of the air-movement 34 is used to classify the object 18 as dense or low-density, or some other indicator useful to estimate/determine if the host-vehicle 12 could be damaged by striking, i.e. running-over, the object 18. Non-limiting examples of how the air-movement 34 may be determined or estimated will now be described in reference to FIGS. 1 and 2.

In one embodiment of the system 10, the air-movement 34 proximate to the object 18 may be determined based on a steering-correction 36 necessary to keep the host-vehicle 12 centered in a roadway 24. As will be recognized by those in the art, a cross-wind 38 (e.g. the air-movement 34 indicated by the arrow in FIG. 2) and/or a road-angle 40 (i.e. how much the roadway 24 slopes from center-line to shoulder) may make it necessary for the steering-system of the host-vehicle 12 to apply a constant steering-torque (i.e. the steering-correction 36) to keep the host-vehicle 12 centered in a roadway 24. The camera (if available) of the object-detector 20 and/or an angle-sensor (not shown) mounted on the host-vehicle 12 may be used to detect the road-angle 40 so that the effects of or contributions due to the cross-wind 38 may be separated from the steering-correction 36.

In another embodiment of the system 10, the air-movement 34 proximate to the object 18 may be determined based on movement of an other-object 42, a tumbleweed 42A and/or a cluster of tall-grasses 42B, and/or a tree 42C for example, proximate to the roadway 24. Linear movement by the tumbleweed 42A, waving movement by the tall-grasses 42B, and/or oscillatory-movement by the tree 42C may all be used an indicator of the air-movement 34. Image-processing of a signal from the camera, or noise-analysis of signals from the radar and/or the lidar may all be used to determine the air-movement 34, as will be recognized by those in the art.

In another embodiment of the system 10, the air-movement 34 proximate to the object 18 may be determined based on air-displacement-model 44 of an other-vehicle 46 passing near, e.g. within five meters (5 m), the object 18. FIG. 2 illustrates the motion-characteristic 32 of the empty plastic-bag 18B as being first blown away from the travel-path of the other-vehicle 46, and then pulled back behind the other-vehicle 46. In this instance, the air-movement 34 is caused by the movement of the other-vehicle 46 rather than necessarily only by wind. The amount that the empty plastic-bag 18B is moved about by the passing if the other-vehicle 46 is dependent on the size, speed, and/or distance between the other-vehicle 46 and the object 18. That is, the air-displacement-model 44 associated with or assigned to the other-vehicle 46 is characterized by the size of the other-vehicle 46, the speed of the other-vehicle 46, and/or a distance between the other-vehicle 46 and the object 18. The air-displacement-model 44 may be established by empirical testing, computer-modeling, or a combination thereof.

Accordingly, an object-classification system (the system 10), a controller 28 for the system 10, and a method of operating the system 10 is provided. If the object 18 is dense and large enough, the log 18A for example, the controller 28 preferably steers the host-vehicle 12 around or away from the log 18A. If the object 18 were a rock (not shown) which is clearly dense, but possibly small enough for the host-vehicle 12 to straddle (i.e. pass over and between the wheels of the host-vehicle 12) without striking, then the controller 28 may operate the host-vehicle 12 to straddle the object. If the object 18 is of low-density (e.g. the empty plastic-bag 18B or the tumble-weed 42A), even if too large to straddle without striking, the controller 28 may allow the host-vehicle 12 to run-over the object 18.

While this invention has been described in terms of the preferred embodiments thereof, it is not intended to be so limited, but rather only to the extent set forth in the claims that follow.

We claim:

1. A system, comprising:
   one or more computers and one or more storage devices on which are stored instructions that are operable, when executed by the one or more computers, to cause the one or more computers to perform operations for operating a host-vehicle, comprising:
   detecting, by an object-detector on the host-vehicle, movement of a first object proximate to the host-vehicle;
   classifying an estimated density of the first object, comprising:
   determining movement of the first object is caused by movement of air proximate to the first object,
   in response to determining that the movement of the first object is caused by the movement of air proximate to the first object, classifying the first object as a dense object based on a difference in a velocity and a change of position of the air proximate to the first object, with a velocity and a change of position of the first object; and
   operating the host-vehicle in accordance with the classification of the classified estimated density of the first object.

2. The system of claim 1, wherein classifying the estimated density comprises classifying the estimated density of the first object as low density or dense, and wherein operating the host-vehicle in accordance with the classification of the estimated density of the first object comprises:
   operating the host-vehicle to avoid the first object if the first object is classified as dense, and
   operating the host-vehicle not to avoid the first object if the first object is classified as low-density.

3. The system of claim 2, wherein the object-detector comprises a first device and a second device, and wherein classifying the estimated density of the first object comprises:
   receiving, from the first device, first data about a first motion-characteristic of the first object proximate to the host-vehicle;
   classifying a first density of the first object as dense, based on the first motion-characteristic;
   receiving, from the second device, second data about a second motion-characteristic of the first object proximate to the host-vehicle;

classifying a second density of the first object as low density, based on the second motion-characteristic; and
classifying the estimated density of the first object as dense.

4. The system of claim 3, wherein the operations further comprise:
in accordance with a classification of the estimated density of the first object as dense, determining whether the host-vehicle can pass over the first object such that first object does not make contact with the host-vehicle; and
in accordance with the determination that the host-vehicle can pass over the first object, operating the host-vehicle to cause the host-vehicle to pass over the first object.

5. The system of claim 3, wherein the first motion-characteristic of the first object is based on one or more characteristics of air-movement of air proximate to the first object.

6. The system of claim 5, wherein classifying the density of the first object based on the first motion-characteristic of the first object comprises:
characterizing the first motion-characteristic of the first object as motionless; and
determining that a velocity of the air-movement of the air proximate to the first object exceeds a pre-determined threshold, wherein the pre-determined threshold indicates the maximum velocity for air proximate to an object that when struck by the host-vehicle, would not cause damage to the host-vehicle; and
in accordance with a determination that the velocity of the air-movement of the air proximate to the first object exceeds the pre-determined threshold, classifying the first object as dense.

7. The system of claim 5, wherein the one or more characteristics of the air-movement comprises a velocity of the air-movement.

8. The system of claim 5, wherein the operations further comprise:
operating the host-vehicle on a roadway; and
computing a velocity of the air-movement of the air proximate to the first object based on air displacement of a second vehicle passing by the host-vehicle, including:
identifying one of a size of the second vehicle, a speed of the second vehicle relative to the first object, and a distance of the second vehicle relative to the first object,
measuring movement of the first object as the second vehicle is within a predetermined distance of the first object as the second vehicle passes by the first object, and
estimating a corresponding velocity of the air-movement of the air proximate to the first object based on an air-displacement-model, wherein the air-displacement-model provides, as a function of: the (i) size, speed, and distance of the second vehicle passing by the first object, and (ii) movement of the first object while the second vehicle was passing by, a corresponding estimated velocity of the air-movement of air displaced by the second vehicle as the second vehicle passed by the first object.

9. The system of claim 5, wherein the operations further comprise:
operating the host-vehicle on a roadway; and
computing the air-movement of the air proximate to the first object based on an actual steering-correction necessary to keep the host-vehicle centered on the roadway, including:
calculating, based on an angle of the roadway, a base steering-correction for the host-vehicle, wherein the base steering-correction is a steering-correction required to keep the host-vehicle centered on the roadway, wherein the base steering-correction is calculated without factoring in a velocity of cross-wind proximate to the host-vehicle, and
calculating a velocity of the air-movement of the air proximate to the first object based on a difference between the actual steering-correction and the base steering-correction.

10. The system of claim 5, wherein the operations further comprise:
operating the host-vehicle on a roadway;
detecting, by the object-detector, a second object proximate to the roadway;
determining that the first motion-characteristic for the second object is characterized as in motion; and
in accordance with a determination that the first motion-characteristic for the second object is characterized as in motion, determining that a velocity of the air-movement of the air proximate to the first object is not zero.

11. The system of claim 1, wherein the host-vehicle is an automated vehicle.

12. The system of claim 1, wherein the object-detector comprises one or more devices, including a camera.

13. The system of claim 1, wherein the object-detector comprises one or more devices, including a lidar device.

14. The system of claim 1, wherein the object-detector comprises one or more devices, including a radar device.

15. A method for operating a host-vehicle, comprising:
detecting, by an object-detector on a host-vehicle, movement of a first object proximate to the host-vehicle;
classifying an estimated density of the first object, comprising:
determining movement of the first object is caused by movement of air proximate to the first object,
in response to determining that the movement of the first object is caused by the movement of air proximate to the first object, classifying the first object as a dense object based on a difference in a velocity and a change of position of the air proximate to the first object, with a velocity and a change of position of the first object; and
operating the host-vehicle in accordance with the classification of the estimated density of the first object.

16. The method of claim 15, wherein classifying the estimated density comprises classifying the density of the first object as low density or dense, and wherein operating the host-vehicle in accordance with the classification of the classified estimated density of the first object comprises:
operating the host-vehicle to avoid the first object if the first object is classified as dense, and
operating the host-vehicle not to avoid the first object if the first object is classified as low-density.

17. One or more non-transitory computer-readable storage media encoded with instructions that, when executed by one or more computers, cause the one or more computers to perform operations for operating a host-vehicle comprising:
detecting, by an object-detector on the host-vehicle, movement of a first object proximate to the host-vehicle;
classifying an estimated density of the first object, comprising:
determining movement of the first object is caused by movement of air proximate to the first object, in response to determining that the movement of the first object is caused by the movement of air proximate to the first object, classifying the first object as a dense object based on a difference in a velocity and a change of position of the air proximate to the first object, with a velocity and a change of position of the first object; and operating the host-vehicle in accordance with the classification of the classified estimated density of the first object.

18. The computer-readable storage media of claim 17, wherein classifying the estimated density of the first object comprises classifying the density of the first object as low density or dense, and wherein operating the host-vehicle in accordance with the classification of the estimated density of the first object comprises:

operating the host-vehicle to avoid the first object if the first object is classified as dense, and operating the host-vehicle not to avoid the first object if the first object is classified as low-density.

* * * * *